US010963520B2

(12) United States Patent
Brelsford et al.

(10) Patent No.: US 10,963,520 B2
(45) Date of Patent: *Mar. 30, 2021

(54) AUTOMATIC PLACEMENT OF HYPERLINKS ON WORDS AND PHRASES IN DOCUMENTS

(71) Applicant: Perfect Sense, Inc., Reston, VA (US)

(72) Inventors: Brendan Brelsford, Herndon, VA (US); David Gang, Oakton, VA (US)

(73) Assignee: PERFECT SENSE, INC., Reston, VA (US)

(*) Notice: Subject to any disclaimer, the term of this patent is extended or adjusted under 35 U.S.C. 154(b) by 61 days.

This patent is subject to a terminal disclaimer.

(21) Appl. No.: 15/638,596

(22) Filed: Jun. 30, 2017

(65) Prior Publication Data
US 2017/0300485 A1 Oct. 19, 2017

Related U.S. Application Data

(63) Continuation of application No. 13/211,199, filed on Aug. 16, 2011, now Pat. No. 9,697,204.

(60) Provisional application No. 61/374,051, filed on Aug. 16, 2010.

(51) Int. Cl.
G06F 16/93 (2019.01)
G06F 16/958 (2019.01)
G06F 40/10 (2020.01)
G06F 40/137 (2020.01)

(52) U.S. Cl.
CPC ............ *G06F 16/94* (2019.01); *G06F 40/137* (2020.01)

(58) Field of Classification Search
CPC .......... G06F 17/3053; G06F 17/30029; G06F 17/30905; G06F 17/211; G06F 17/2235; G06F 17/30882; G06Q 30/0277
See application file for complete search history.

(56) References Cited

U.S. PATENT DOCUMENTS

| 6,154,786 | A | 11/2000 | Williamson et al. |
| 6,874,122 | B1 | 3/2005 | Bates et al. |
| 7,421,432 | B1 | 9/2008 | Hoelzle |
| 8,005,858 | B1* | 8/2011 | Lynch .................. G06F 40/14 715/234 |

(Continued)

OTHER PUBLICATIONS

Strand, Matthew, "Metropolis-Hastings Markov Chain Monte Carlo," May 2009, Chapman University.

(Continued)

Primary Examiner — Ariel Mercado
(74) Attorney, Agent, or Firm — Fish & Richardson P.C.

(57) ABSTRACT

Methods, systems, and apparatus relate to technologies generally relating to the placement of hyperlinks within the body of text of a document. The placement of hyperlinks can be on specified words or phrases, according to a specified link distribution function across the body of the text content of a document. Some techniques involve a method for determining a placement of links on a document that involves selecting a document comprising words of text for placing links in the document, selecting a link distribution function, and using the link distribution function in determining locations for the placement of the links in the document. The placement of hyperlinks in the document may be automatically performed on a server side.

18 Claims, 11 Drawing Sheets

(56) References Cited

U.S. PATENT DOCUMENTS

| | | | |
|---|---|---|---|
| 8,255,786 B1* | 8/2012 | Gattani | G06F 16/9558 |
| | | | 715/205 |
| 2001/0007980 A1 | 7/2001 | Ishibashi et al. | |
| 2004/0068527 A1 | 4/2004 | Smith, III | |
| 2007/0185861 A1 | 8/2007 | Budzik et al. | |
| 2007/0219940 A1 | 9/2007 | Mueller et al. | |
| 2008/0104073 A1 | 5/2008 | Gorelick et al. | |
| 2008/0193048 A1 | 8/2008 | Sun et al. | |
| 2008/0319950 A1* | 12/2008 | Lasa | G06F 16/957 |
| 2009/0327858 A1 | 12/2009 | Tsun et al. | |
| 2010/0100536 A1 | 4/2010 | Chamberlain et al. | |
| 2012/0259702 A1 | 10/2012 | Zhang et al. | |

OTHER PUBLICATIONS

Umrigar, Cyrus, "Monte Carlo Methods," Feb. 2010, Cornell University.

PCT International Search Report and Written Opinion for Application No. PCT/US11/47944, dated Dec. 23, 2011, 7 pages.

* cited by examiner

300

```
_____ low _____
_____ when _____
305 ⌒           _____ as _____
                              _____ glucose _
                                   310⌒  ___ in
_____ is _____
                                   _____ liver
                                        320⌒
                              ___ to _____
              ___ the _____
_ not _____
                              _____ or _____
_____ how _____
                                   _____ if _
                                        __ do
                         _____ and _____
_ sugar _____
  330                              _____ an _
_ of _____
```

AUTOMATIC PLACEMENT OF HYPERLINKS ON WORDS AND PHRASES IN DOCUMENTS

CROSS-REFERENCE TO RELATED APPLICATIONS

This application is a continuation (and claims the benefit of priority under 35 USC 120) of U.S. application Ser. No. 13/211,199, filed Aug. 16, 2011, now allowed at U.S. Pat. No. 9,697,204, which claims the benefit of priority of U.S. Provisional Application Ser. No. 61/374,051, filed on Aug. 16, 2010. The entire contents of both applications are hereby incorporated herein by reference.

TECHNICAL FIELD

This disclosure relates to techniques for the placement of hyperlinks within a body of text of a document.

BACKGROUND

The growth of interactive digital networks has enabled businesses and individuals to engage in a variety of forms of electronic advertising. Using these interactive digital networks, a business or individual may post an advertisement that can be viewed by a webpage's visitor. For example, a webpage's visitor may see advertisements for a business or individual's services or goods.

SUMMARY

This specification describes technologies generally relating to the placement of hyperlinks within the body of text of a document, with the placement of the hyperlinks being performed automatically. The specification describes the placement of hyperlinks on specified words or phrases, according to a specified link distribution function across the body of the text in the document.

In general, some aspects of the subject matter described in this specification can be embodied in methods that involve hyperlinking. Other implementations of these aspects include corresponding systems, apparatus, and computer programs, configured to perform the actions of the methods, encoded on computer storage devices.

Some techniques involve a method for determining the placement of links on a document that involves selecting a document having words of text for placing links in the document, selecting a link distribution function, and using the link distribution function in determining locations for the placement of the links in the document.

These and other embodiments can each optionally include one or more of the following features. The method can involve determining a maximum of the link distribution function to determine the placement of the links in the document. The method can involve applying a Monte-Carlo function to the selected link distribution function. The method can include accessing a dictionary comprising any of a key-value pair list. The Monte Carlo method can be a Metropolis-Hastings Monte Carlo method to reduce a number of the operations associated with determining the placement of links on the document. The method can involve associating values with the words. The method can involve selecting a group of words that are located around the maximum of the link distribution function. The method can involve determining a link density to apply to the words of the document, where the link density includes a number of cross-linked characters that are divided by a number of characters in a string of characters. The link density can be configured to be a fixed-sized length of characters, a variable size length of characters, or a length of characters in a window that includes a character offset number. The method can include determining the placement of the links at least by convolving the link distribution function with a Gaussian function. The link distribution function can be a flat link density function. The method can involve selecting a link distribution function based upon a location of a group of links in the document. The method can involve associating types with the words in the document, where different words can be associated with different link distribution functions. The types associated with the words can include a default type and a sponsor type, where the sponsor type can be associated with a dictionary of key words that links to sponsored pages. The words associated with the sponsor type can be configured to be grouped into an area of the document that is less than an entirety of the document. The area of the document can be located at a beginning area of the document. The method can involve utilizing a link distribution function having a cosine function with n troughs to produce n clusters of links, wherein n is equal to or greater than 1, and determining the placement of the links at least by convolving the link distribution function with a Gaussian function. The method can be performed in a content management system. The content management system can have a server, for which the selection of the document, the selection of the link distribution function, and the determination of the locations of the placement of the links in the document can occur at or around the server in the content management system.

The details of one or more implementations of the subject matter described in this specification are set forth in the accompanying drawings and the description below. Other features and aspects of the subject matter will become apparent from the description, the drawings, and the claims.

BRIEF DESCRIPTION OF THE DRAWINGS

FIG. 3 depicts a graph with an example of link placements in a document that are evenly spaced from one another.

FIG. 5 depicts a graph of with an example of link placements in a document where the links are clustered together in a single cluster.

FIG. 9 depicts an example of a website where hyperlinks have been placed based on an analysis of the link density.

FIG. 10 depicts an example of a user interface of a crosslinker tool that has identified and analyzed various words and phrases in a website similar to FIG. 9.

Like reference numbers and designations in the various drawings indicate like elements.

DETAILED DESCRIPTION

Figure 1:
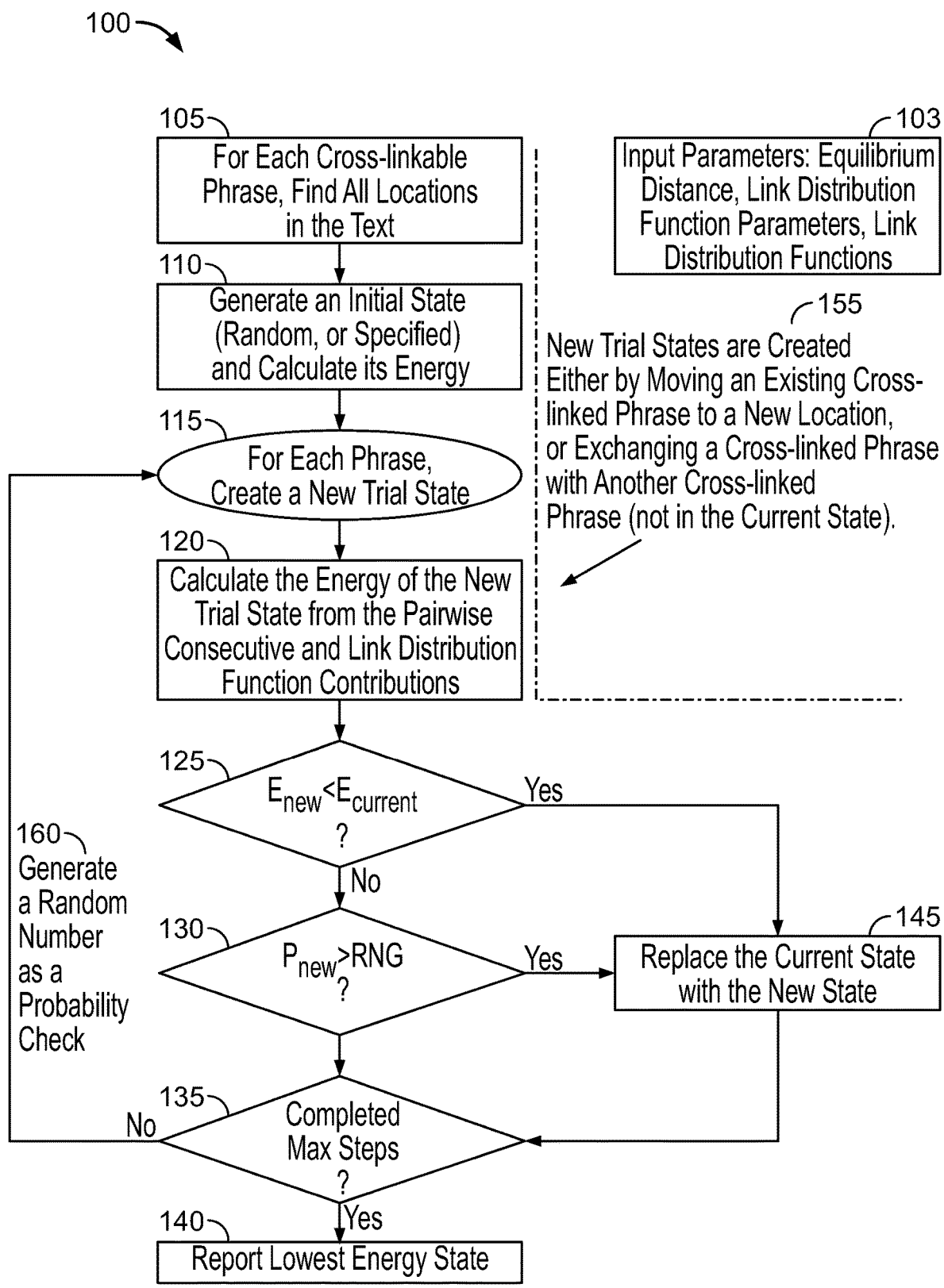
FIG. 1 depicts a diagram of an example of a process for placing hyperlinks.

Hyperlinks or links refer to a type of code that is associated with a word, a group of words, or an image, for example, where the word, group of words, or the image can be selected to activate the link and jump to a section of a document or another document, such as a web page. The code can be, for example, a type of HyperText Markup Language (HTML), a type of Extensible Markup Language (XML), a type of Extensible Hypertext Markup Language (XHTML), or some text wrapper, suffix, or other means of highlighting and/or designating a portion of a document for the purpose of linking to another section of the document or to another document.

The term for a "link" (e.g., a "link," "cross-link" or "crosslink") may generally refer to, for example, an additional string of HTML, XHTML, XML or text wrapper, prefix, suffix, or any other means of highlighting and/or designating a sub-string of a larger document for the purpose of linking to another document or another section of the same document. The document itself need not be ordinary text, but may be XML, for example. The linking portion of the cross-link may be used for consumption by end users, used by search engine spiders or crawlers, used by automated scripts designed to extract such links from a document, or used by any combination of these. A "hyperlink" may refer to a specific embodiment of a cross-link.

Links can be placed at various locations in a document, such as a web page or some other type of document using text. In some implementations, some of the linked locations may depend on the context of the document, and in other implementations the locations may be placed on word(s) in locations where a user is most likely to view them. Some of these locations may be used for advertisers or for other web page presenters, where a user's selection (e.g., mouse or touchpad click) of the link is important. For example, an advertiser (e.g., a sponsor listed on a web page) may have one or more links positioned on words throughout a web page document where a user can select the link to open a web page document with the advertiser's information, and the advertiser may want to place the links in locations where a user is likely to view and select the link. One factor that may be taken into consideration when the link locations are selected may be, for example, spacing the link locations throughout the web page document or spacing the links throughout a section of the web page document so that the links are not clumped or grouped together in an area of the web page document. In some implementations, a grouping of (spaced-apart) links in a section of the document may be preferred. As described below for some implementations, the link locations may be distributed throughout the web page document by utilizing a distribution function.

In the context of some implementations of the link placement optimization method, the desired spacing between links in the optimized output can be designated in units of characters (e.g., 8-bit Unicode Transformation Format (UTF-8), or other specified encoding). In the absence of any link distribution functions, the optimal link placement may include inter-link spaces as close as possible to the desired spacing. In the presence of link distribution functions, the optimal link placement may include inter-link spaces that are modified from the specified desired spacing. These can optionally be calculated from the distribution functions in terms of equilibrium spacing.

"Equilibrium spacing" may refer to an analytical solution for the "inter-link spaces" based on the specified "desired spacing" and the "link distribution function." Some of these calculated "inter-link spaces" may refer to goals to which the optimization method can generate a distribution as close as possible. For example, if the "desired spacing" was 100 characters and a cosine "link distribution function" was also specified, then the "equilibrium spacing" would be less than 100 characters near the troughs of the cosine function, and greater than 100 characters near the peaks of the cosine function. It may also be described as a "modified desired spacing" given a "desired spacing" in the presence of a "link distribution function."

A link density may refer to a number of cross-linked characters that are divided by the total number of characters in a string of characters, such that the link density is indicative of the number of links per character, or the numbers of characters per link. The link density can be defined over a range, which may include the entire document or a portion of the document. When referring to the "link density" as a quantity that varies over the length of the document, such a quantity can be defined, for example, over a fixed number of characters, a variable number of characters, or a window that is centered about a specific character offset position in the document. In an example, the link density may also be interpreted as the global link density of the document when it is defined over the entire document. In some implementations, the link density function can indicate the output of the optimization method.

A "link distribution function" can include any number of parameters, and generally includes at least one variable (e.g., "x") as the character offset from the beginning of the document to be processed. This function can be a scalar function that can be used to mathematically describe the desired layout of links within a document. For example, a link distribution of the form $f(x)=A*\cos(2*\pi*x/L)$, with A being an amplitude and L being specified as some number of characters, may be used to generate optimized layouts that include areas of high link densities that coincide with one set of extrema of the distribution function (peaks, at 0, L, 2L, 3L, . . . ), and areas of low link density that coincide with the other set of extrema (troughs, at L/2, 3L/2, 5L/2, . . . ). Some examples of these distribution functions are described below. While the link distribution function can be any arbitrary scalar function, one application employs a Fourier series that is controlled through a user interface for the purpose of allowing a user to graphically construct such a distribution function without needing to interact directly with the mathematical structures. In some implementations, the link distribution function can be one component of the input of the optimization method. For example, a link distribution function can be combined with a desired spacing, or even multiple link distribution functions to affect a final output link density function.

Web site administrators, for example, may wish to change a specified link-density distribution in real-time since exhaustively searching all possible hyperlink location configurations may take amount of time and users may not be willing to wait hours or days for a web page to load. Some factors that may determine this amount of time may be an amount of the text in the document and the size of the dictionary (e.g., number of words in the dictionary). For text content to be processed "on-the-fly," the locations of potentially linkable words and phrases may not be known a priori.

With such on-the-fly processing, a maximum number of linkable words or phrases found in the text will be linked according to a link distribution function, with which a process for determining the optimal locations for hyperlinks can be measured in accordance with its outputted link-density function.

In one aspect, there can be an assignment of an energy function to the system, which can involve, for example, computing total system energy. For a uniform link distribution function, a lowest energy configuration can result when the hyperlinks are spaced evenly apart within the confines of where the words and phrases actually appear in the text. To obtain such a low energy configuration, an initial configuration may be selected and a Monte-Carlo method then can be applied to lower and minimize the system energy, resulting in a solution that can be arbitrarily close to an optimal solution, depending on the time allowed for the solution to be determined. The optimal solution, at least in some implementations, can refer to a solution where the hyperlinks are located as closely as possible to the desired link-density, within the confines of where the words and phrases actually appear in the text. This process can be generalized to accommodate a wide range of applications similar to that of spacing hyperlinks uniformly.

By associating "values" with the words or phrases before applying the optimization method, the resulting solution can feature more highly valued words or phrases that are closer to the maxima of the link distribution function. By associating "types" with the words or phrases, in addition to the aforementioned values, different sets of words or phrases can have different link distribution functions specified, which can result in multiple concurrent hyperlink placement goals, where each goal is specific to a different type of word or phrase. The "types" may be categories of key words that can have their own range of values and associated link distribution functions. For example, there may be a "default" type with words linking to other pages in a website. There may be a type associated with sponsors, where there is a dictionary of key words linking to sponsored pages, for example, to link from one site to a sponsored site to fulfill a traffic quota. The various "types" may have different characteristics, such as having the sponsored types being likely to congregate towards the beginning of a document, and the default types being evenly distributed throughout the document. The sponsored types and the default types may also be configured to interact with each other so that the links for each type are spaced apart in a certain manner. Each type may also be considered as a contribution to the calculated configuration energy in an associated Monte Carlo simulation.

In some implementations, the document may be configured to have the links designated on the server side (instead of the client side), so that users of the document would not know that the system is automatically (e.g., without a human interaction of placing the link) placing the links in the document on the server side. Sponsors of web pages may have increased traffic to their website caused by the redirection to their site, and the links to the sponsors' web pages may enhance their search engine optimization (SEO) position.

In some implementations, instructions or software for the linking process can be integrated at or around the server or be placed somewhere in the workflow of a content management system. For example, the source material (e.g., document) may reside outside of a tool that uses this process, and a cross-linked document can be provided upon request so that the content management system would see the fetching of the document as extracting an already-crossed linked document. The tool may refer to a user interface (UI) that can be used either for the purpose of managing content that is filtered through the crosslinker, or for managing the configuration of the crosslinker itself. In some implementations, the instructions or software for the linking process may reside between the source material (e.g., document) and the end application of the content.

In an analogy to a physical system of masses attached to each other by springs that also interact with an external field, for example, the link distribution function may act like an external-field contribution to the system energy, the values may represent the "charge" of a word or phrase, and the contribution of such a "charged" word or phrase to the system energy can be determined by its interaction with the applied "external-field." In the same analogy, the words or phrases, which act like masses attached by springs, may be connected either consecutively along a one-dimensional coordinate corresponding to the character position of the start of the word or phrase, or pairwise throughout a two-dimensional coordinate system corresponding to the separation in pixels or other distance measure within the document, between words or phrases, and projected onto two orthogonal axes. The words or phrases having different "types" may act like different types of particles, for example, where each particle may interact with its own type of external field, as well as external fields common to all types of particles. The external-field contribution may also be described as a value between where the word is located and the link density function, or the external-field contribution may be described as a way of how well the words are aligned with the desired function. The external-field contribution may also be described, for example, as the link density function, where the external-field contribution may be, for example, the amplitude of the field multiplied by the value associated with a word at that amplitude. The calculation of the external-field contribution may be arbitrary. This analogy to the physical system is presented for explanation purposes.

The applications may range from generating a cleaner user experience for cross-linked text, to the strategic placement of words and phrases based, for example, on their value to search engine optimization (SEO), sales, or traffic. For example, words or phrases that link to a sponsored page can be temporarily assigned to appear near the top of a web page document by applying the correct link distribution function to the optimization method for the duration of the sponsorship period. By having the link to the sponsored page located near the top of the web page document, the sponsor can get more leads from search engines, which may mean more traffic, more sales, and greater revenue, for example. The link may be associated with meta tags that include a description and keyword(s) for the link.

In some implementations, there can be a dictionary of terms (e.g., a word or a key phrase that can have a URL associated with it), where the dictionary can be used to find words within documents or phrases and associate a link with the located words. The dictionary may be, for example, a key-value pair list of phrases, words, and destinations. A search engine optimization value can be added to a website by interlinking the words within a content website. In some implementations, this process can be performed on the server side (instead of the client side), where the links can be placed on words before the content is delivered to the user. The process of crosslinking can occur before the document is sent to the end user. This can be used by an entity that utilizes an SEO position and provide value at least because these links/words can be indexed on the server side. From the viewpoint of the entity that has the SEO position, at least in view of the search engines, the links can be considered to be part of the original document being sent from the web server to the end user. From the search engine's point of view, links to related content within a piece of content can help to legitimize both pieces of content as being about the same topic. In some implementations, updates in the dictionary may trigger corresponding updates in the placement of links on the document.

In some implementations, for example, the link distribution function may be a one-dimensional function that may be defined based on character location. For example, if there are 5000 character locations in a document, then the link distribution function may be defined from 0 to 5000, and the link distribution function may have an amplitude. The function may be used to center the links at locations where the amplitude of the link distribution function is high. The link distribution function may be flat for evenly-spaced links in the document, the link distribution function may be a sloped line so that there is a bias for placing links at the beginning or the end of the document, or the link distribution function could be any arbitrary function (e.g., such as a Fourier function). Some documents, for example in a web page with sponsored links were users are likely to view the beginning of a document, may have links at the beginning of the document that are placed by a sloped line from the link distribution function, and may have other default links that are placed by any general format in the remainder of the document.

In some implementations, there may be multiple dictionaries used, where some dictionaries may be preferred over others, and the preferred dictionaries may be used in cases of conflicts or in cases of multiple meanings of links and words.

FIG. 1 depicts a diagram of an example of a process for generating the placements of hyperlinks. In the process, all locations in the text are found for each cross-linkable phrase (or word) in the document (105). Then, an initial state is generated and an energy of the initial state is calculated (110). The initial state can be, for example, a randomly-generated state or a specified or predetermined state. A new trial state is created for each phrase or word (115). New trial states are created, for example, either by moving an existing cross-linked phrase to a new location, or by exchanging a cross-linked phrase with another cross-linked phrase (that may not be in the current state) (155).

An energy of the new trial state from pairwise consecutive and link distribution function contributions is calculated (120). The "pairwise consecutive" contribution to the total energy can generally refer to the energy associated with an interaction between two consecutive links, for example, as a function of their separation distance (e.g., in numbers of characters). For instance, as the positions of two consecutive links within a document are brought closer together, the amount of energy contributed to the total energy from their configuration can increase. The "link distribution function" contribution to the total energy can refer to the energy associated with one link's interaction with an externally imposed energy function. As an example, for a linear link distribution function, the contribution to the total energy due to one link's interaction with this field can change linearly with its distance (e.g., in number of characters) from the start of the document.

The energy of the new trial state, $E_{new}$, is compared with the energy of the current state $E_{current}$ (125). If the energy of the new trial state, $E_{new}$, is less than the energy of the current state $E_{current}$ then a comparison is made in regards to a probability check for the likelihood of the trial state (130). If the energy of the new trial state, $E_{new}$, is not less than the energy of the current state, $E_{current}$, then the current state is replaced with the new state (145) and a determination is made to see if the maximum number of steps have been completed (135).

A random number, RNG, is generated for the probability check (160). The generation of the random number, RNG, for this part of the process can serve as the probability check for the likelihood of the new trial state. The probability can be normalized, for example, so that it can fall within the range [0, 1], and so that the random number is generated over the same range. If the random number generated, RNG, falls below the probability of the new trial state, $P_{new}$, then the new trial state is accepted (145), even though it is of higher energy. This may be part of the Metropolis-Hastings algorithm, for example, which can ensure that the sampled distribution of states move toward the desired distribution of states, which can be specified as a Boltzmann distribution of energy states in the probability function. If the random number generated, RNG, does not fall below the probability of the new trial state, $P_{new}$, then the determination is made to see if the maximum number of steps have been completed (135).

If the number of maximum steps has been completed, then the lowest energy state is reported (140). If the number of maximum steps has not been completed, then a new trial state is created for each phrase (115). The determination for the maximum number of steps (135) relates to a number of times the process will generate the new trial state. For a fixed number of maximum steps, the time allocated for the determination can depend on the number of trial states possible for the system (e.g., the number of available links, the number of positions available for each of the links, etc.). In some implementations, the "max steps" parameter may refer to a fixed limitation on processing or on computation time across an implementation of this process, and in other implementations, the "max steps" parameter can be used for limiting these quantities for a specific piece of content where the number of links and link positions are fixed.

In the process of FIG. 1, the specificity of the external-field/single-link interaction can include multiple interactions of a link with different link distribution functions. For example, by specifying an additional "type" for the links in this system, multiple link distribution functions can be applied based on the "type" parameter of the link. This added complexity may give rise to type-specific behaviors (e.g., such as "sponsor" links congregating toward the top of a document, while all other links spread out evenly throughout the rest of the document). The link values can act in such a way as to specify the relative strength of interaction between a link and each of the link distribution functions. The type-specific features, for example, may be implemented in FIG. 1 as an additional loop over all specified link distribution functions in conjunction with calculating the energy of the new trial state (120).

The process of FIG. 1 may also involve input parameters for equilibrium distance, link distribution functions, and link distribution functions parameters (103). The link distribution function parameters can be scalar values used to indicate the relative strengths of different interactions (pairwise and link distribution function). For reference, the link distribution function parameter of the pairwise repulsive interaction can be taken to be 1. As an example, an assumption can be made that the links are to be denser near the bottom of a document and less dense near the top of the document.

In this example, an external link distribution function of the form F(x)=A, can be used, with A being a constant, specified link distribution function parameter. The associated energy can be determined using a function of the form: E(x)=−A*x, causing links closer to the end of the document to contribute negatively to the total energy. Configurations that have lower energy can be more likely to occur as the process progresses, so the final output will tend towards having more links near the end of the document, and fewer links near the beginning of the document. While specific initial values can be calculated (non-trivially), in practice, these values can be empirically tailored to specific applications.

The equilibrium distance, D_eq, can determine the average link spacing in the final configuration. It can be set to an initial value using one of two sub-processes, depending on whether the maximum number of links desired, NL_max, in a document is less than the number of available links, NL_tot, from a dictionary source.

Case 1:
IF (NL_max<NL_tot)
Calculate the average of the total length of linked content, avg_LL, as the average length of an available linked word, multiplied by the max number of links allowed in the document. This case takes into consideration the lengths of all available links in computing the average link length, even though fewer than all of the links may be used in the final output.
avg_LL=sum(i=1 to NL_tot, length(Link_i))*(NL_max/NL_tot)
Subtract the average total length of linked content from the total length of the document (in number of characters), and divide by the max number of links allowed (or NL_max+1 if spacing before the first link and after the last link is desired).
D_eq=(length(Document)−avg_LL)/(NL_max)
Case 2:
ELSE
Similar to case 1, except that total length of linkable content is a simple sum, and there are no additional links over which to construct an average.
LL=sum(i=1 to NL_max, length(Link_i))
D_eq=(length(Document)−LL)/(NL_max)

An example of an application utilizing FIG. 1 may involve a Metropolis-Hastings Monte Carlo optimization method addressing the generation of a document layout with link locations that are in accordance with specified link distribution functions. The Metropolis-Hastings Monte Carlo optimization method may result in a reduction or a minimization of the number of calculations at each step in the process. There may also be simulated annealing performed in the Monte Carlo method to determine a fine or granular result.

Figure 2:
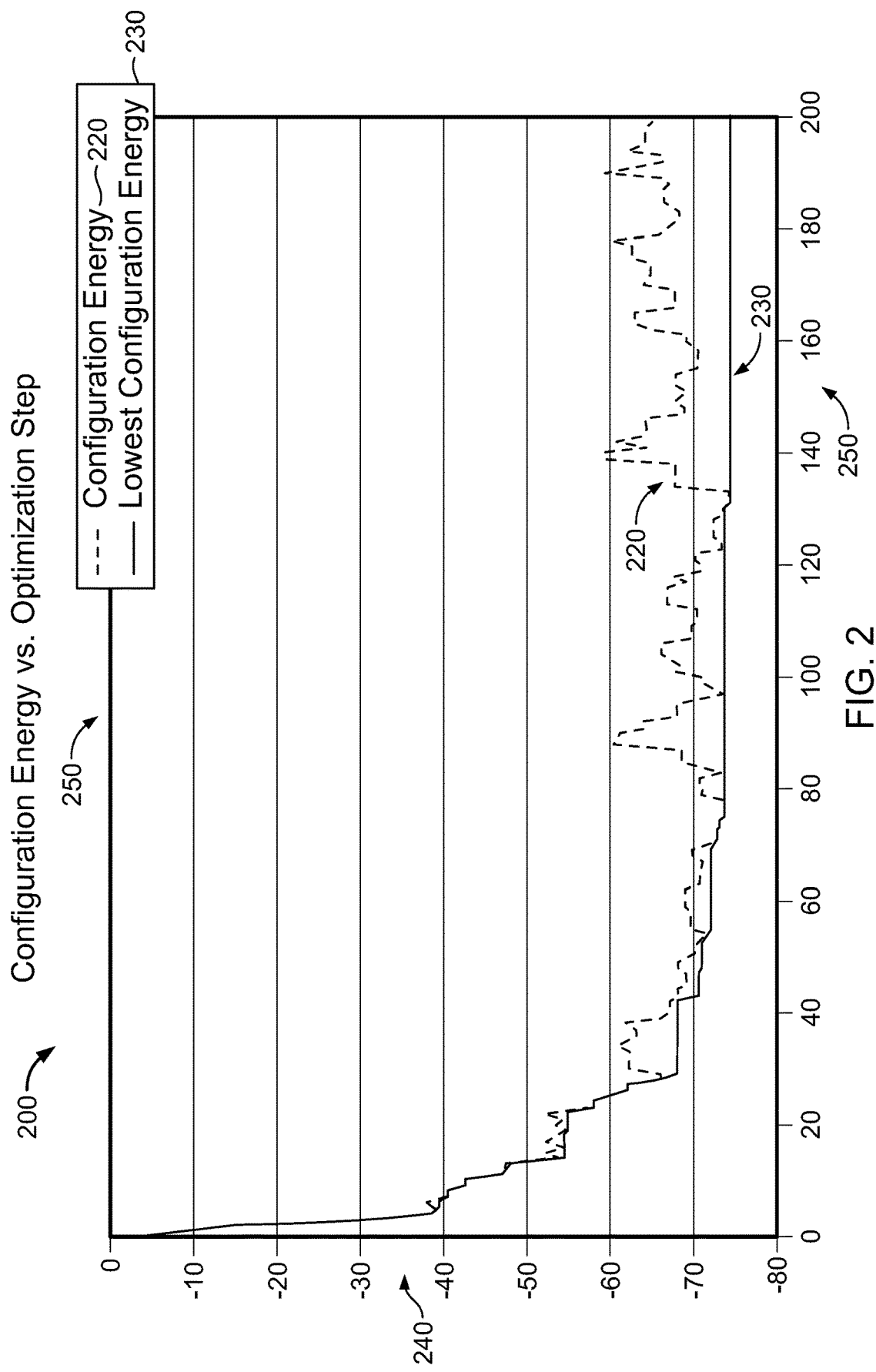
FIG. 2 depicts a graph with an example of energies as a function of the process.

FIG. 2 depicts a graph 200 with an example of energies as a function of the process. In particular, FIG. 2 shows a graph 200 of the total energy of the system (energy scale is y-axis) decreasing over time (time scale is x-axis 250) as the optimization process takes place. The graph 200 illustrates an example of a configuration energy 220 versus time 250, where the optimization process progresses as time 250 increases from the start of the process. The graph 200 shows the configuration energy 220, which represents the extremum quantity, and the lowest energy configuration state 230 of the configuration energy 220 at a particular time in the optimization process.

The optimization process may also be described as a process of determining a global minimum of the energy, where the lowest energy configuration state 230 of the configuration energy 220 at a particular time in the optimization process can be a local minimum. In some cases, the maximum of the link distribution function can represent the global minimum of the energy. For example, the maximum of the link distribution function may be used in the valuation of key words. For instance, a simulation can obtain a result where each key word in a dictionary has the same value, but in some cases, each key word has a predefined value in dictionary and those values can be used as a weighting on the result so that the more highly-weighted key words (e.g., highly-valued key words) would be more well aligned with the desired distribution function. So the more highly-valued words would be more attracted to the maximum of the link distribution function (or the minimum of the global energy).

FIG. 3 depicts a graph with an example of link placements in a document 300, where the links are placed in the document so that they are evenly spaced apart. The document 300 shows rows 305 where words are placed in a document, for which the words that are shown, such as "glucose" 310, "liver" 320 and "sugar" 330, are the links in the document 300, which are evenly-spaced apart from one another. In some implementations, the distance of where the links are spaced apart from one another may refer to a number of characters (or words) between links in the document or in at least a section of the document.

Figure 4:
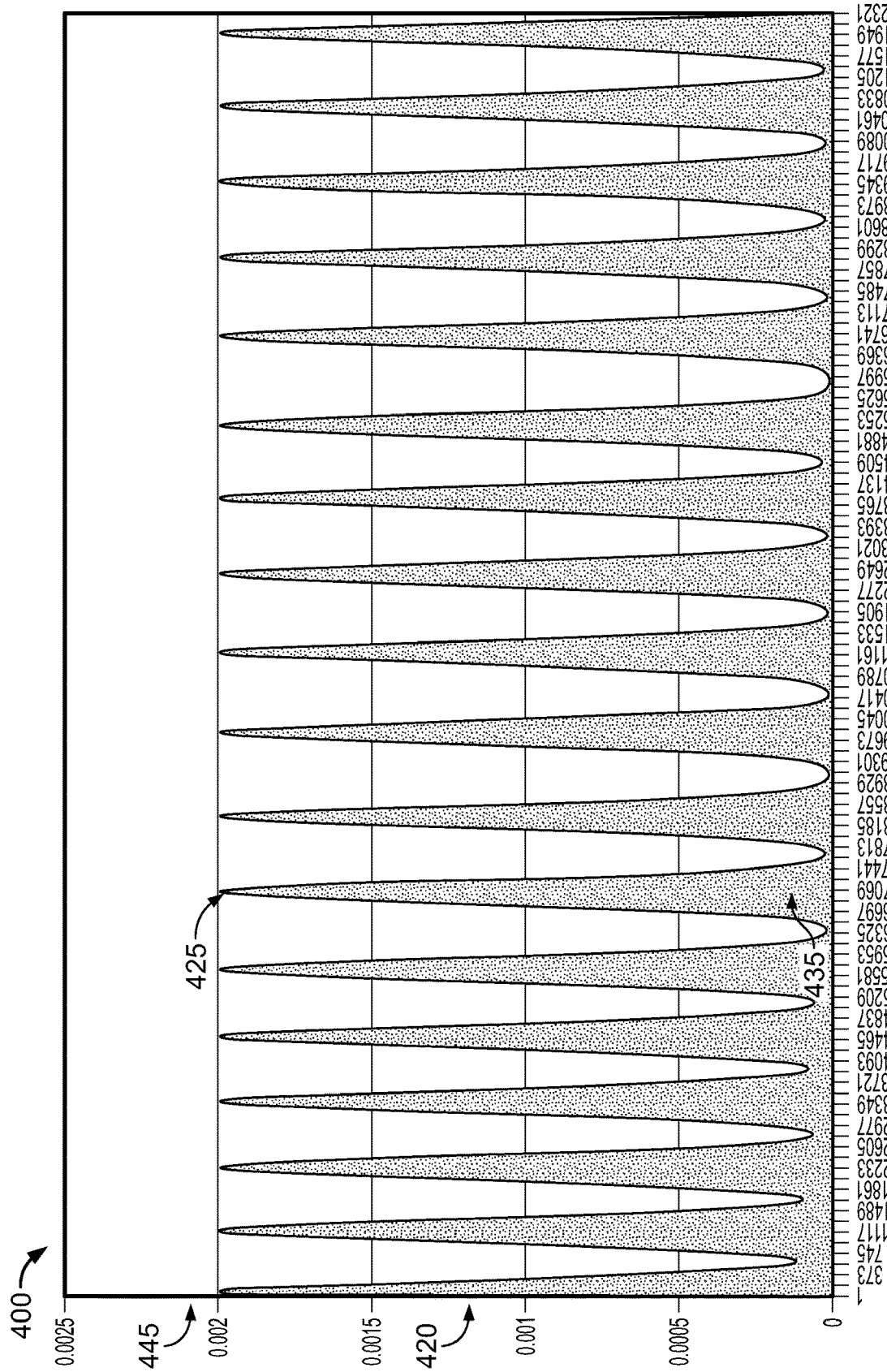
FIG. 4 depicts a graph with an example of a link density function to produce the evenly spaced link placements of FIG. 3

FIG. 4 depicts a graph 400 with an example of a flat link density function to produce the evenly spaced link placements of FIG. 3. The y-axis has a scale 420 for the link distribution function 435, and the x-axis has discrete intervals 410 for the discrete link density function. The link density function of FIG. 4 can be used to produce the evenly-spaced link placements of FIG. 3 by convolving a discrete link density function (e.g., 0 or 1 at every character location in the document, indicating whether the character is part of a link (1) or not (0)) with a Gaussian function. The discrete link density function can be used to approximate a link density function with continuous density. In FIG. 4, the link distribution function 435 has multiple peaks 425 at the same level 445.

Figure 5:
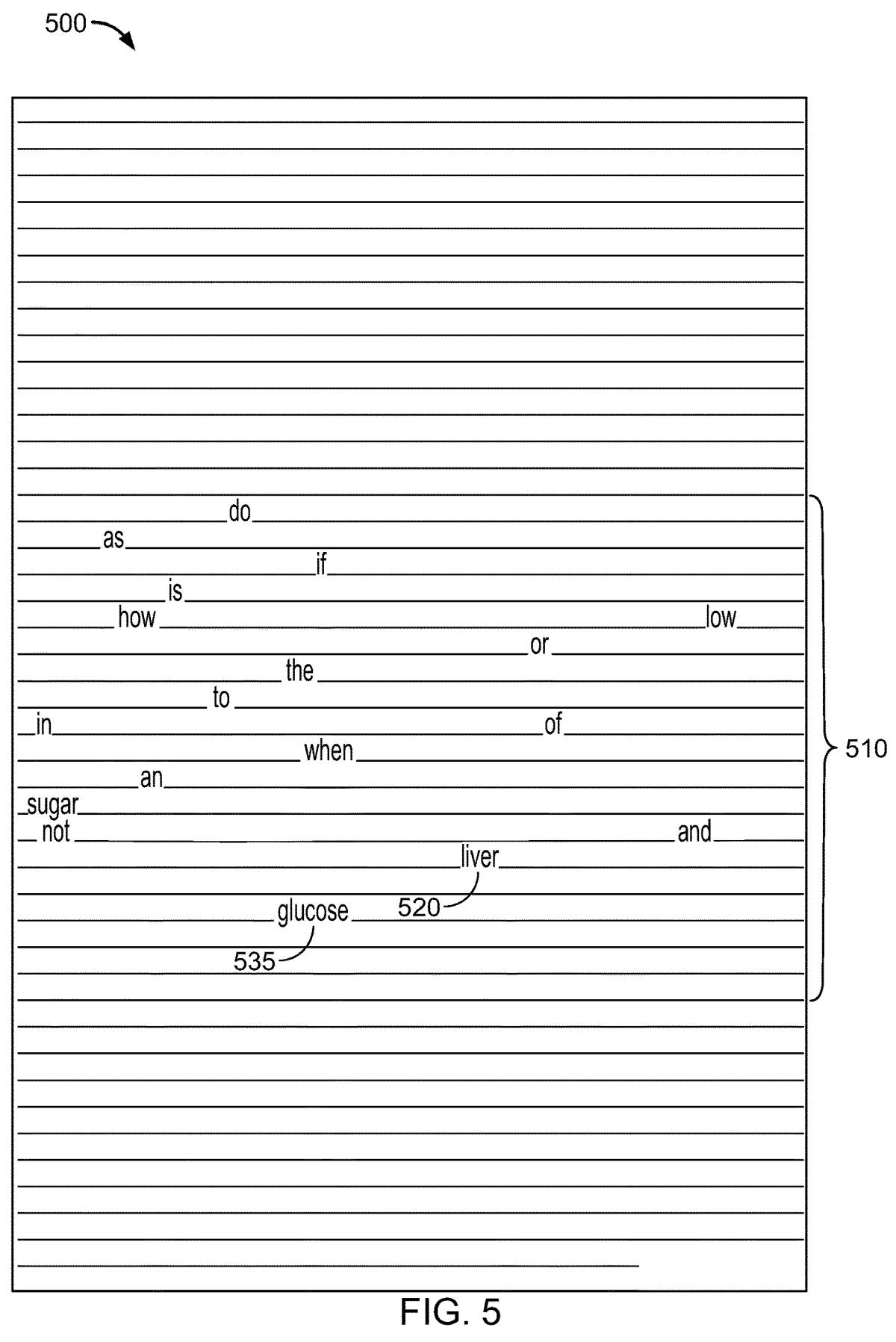

FIG. 5 depicts a graph of with an example of link placements in a document 500 where the links are clustered together in a single cluster 510. For instance, links in the document 500, such as "glucose" 535 and "liver" 520, are spaced apart from each other and other links. All of the links are clustered together in an area of the document 500 as a result of the link distribution function 635 (e.g., a cosine function with one trough) of FIG. 6.

Figure 6:
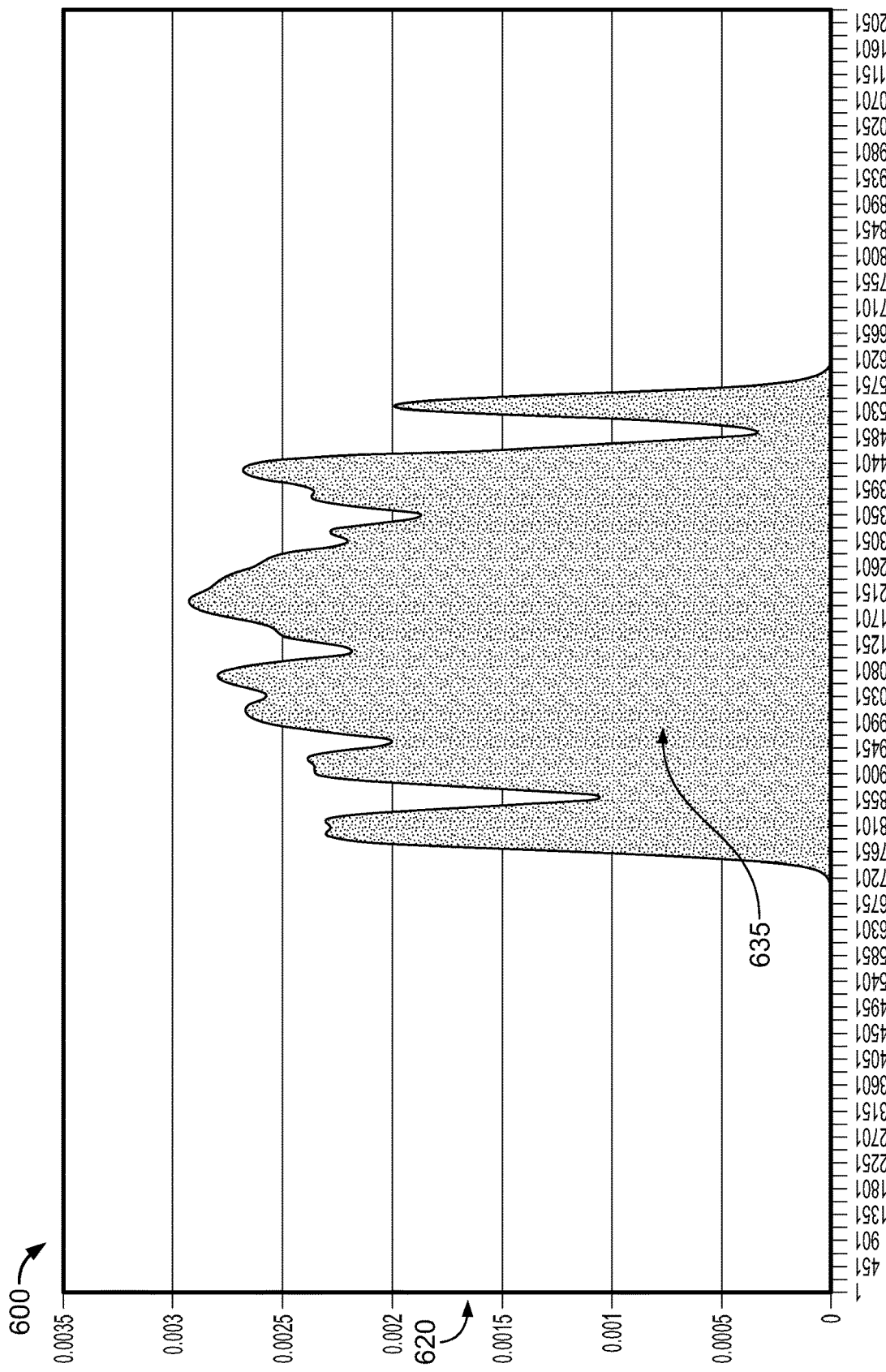
FIG. 6 depicts a graph with an example of a link density function with a cosine function with one trough to produce the single cluster of links of FIG. 5.

FIG. 6 depicts a graph 600 with an example of a link density function with a cosine function with one trough to produce the single cluster of links of FIG. 5. In FIG. 6, this link distribution function 635 can be convolved with a Gaussian function to produce the link placements of FIG. 5. The y-axis has a scale 620 for the link distribution function 635, and the x-axis has discrete intervals 610 for the discrete link density function.

Figure 7:
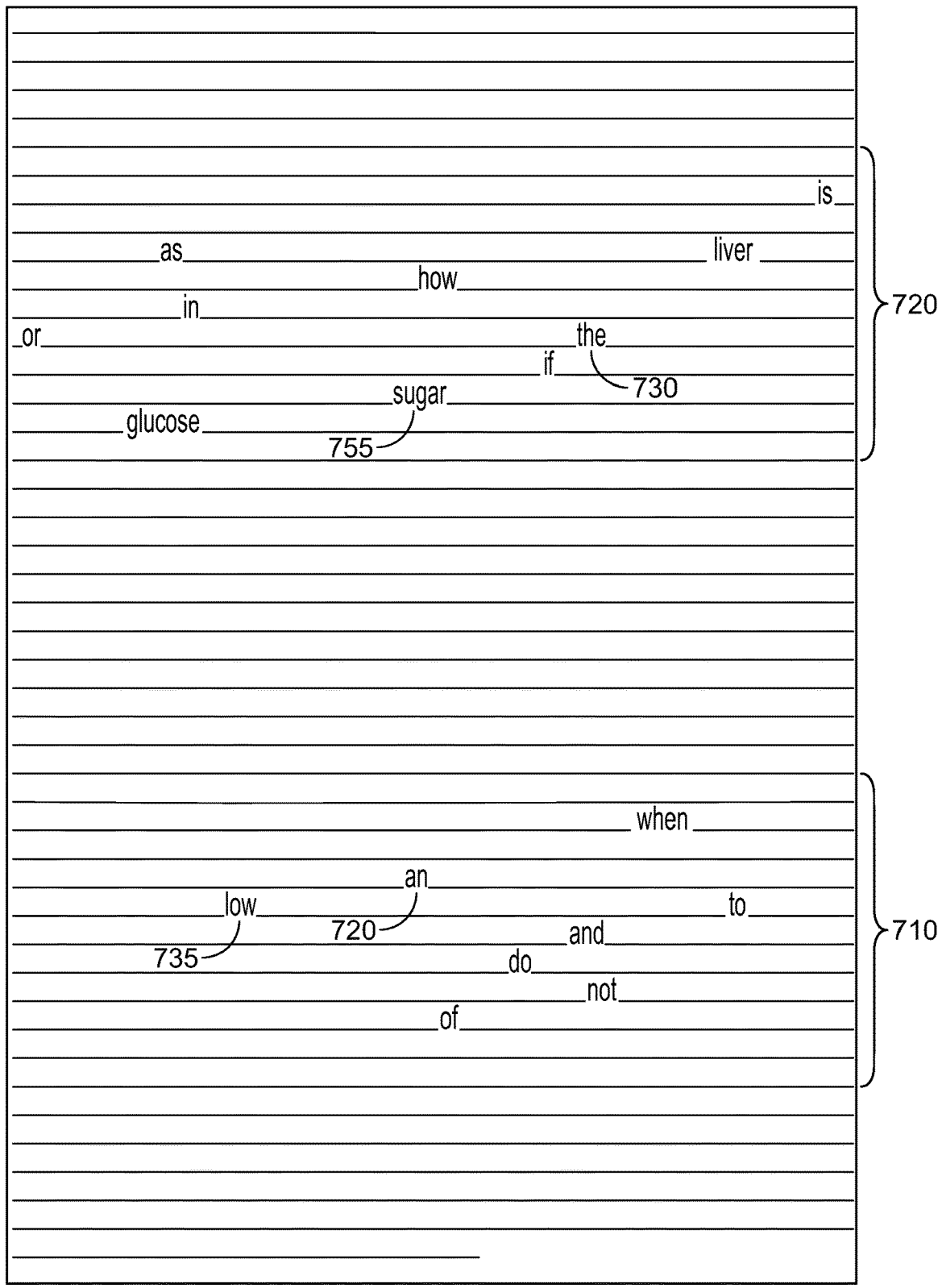
FIG. 7 depicts a graph with an example of link placements in a document where the links are clustered together in two clusters.

FIG. 7 depicts a graph with an example of link placements in a document 700 where the links are clustered together in two clusters that are evenly-spaced apart. The document 700 has a first cluster 710 and a second cluster 720, that are spaced apart from each other. Each cluster 710, 720 has links (e.g., the links for "low" 735 and "an" 720 in the first cluster 710, and the links for "sugar" 755 and "the" 730 in the second cluster) that are evenly spaced apart from other links in the same cluster 710, 720.

Figure 8:
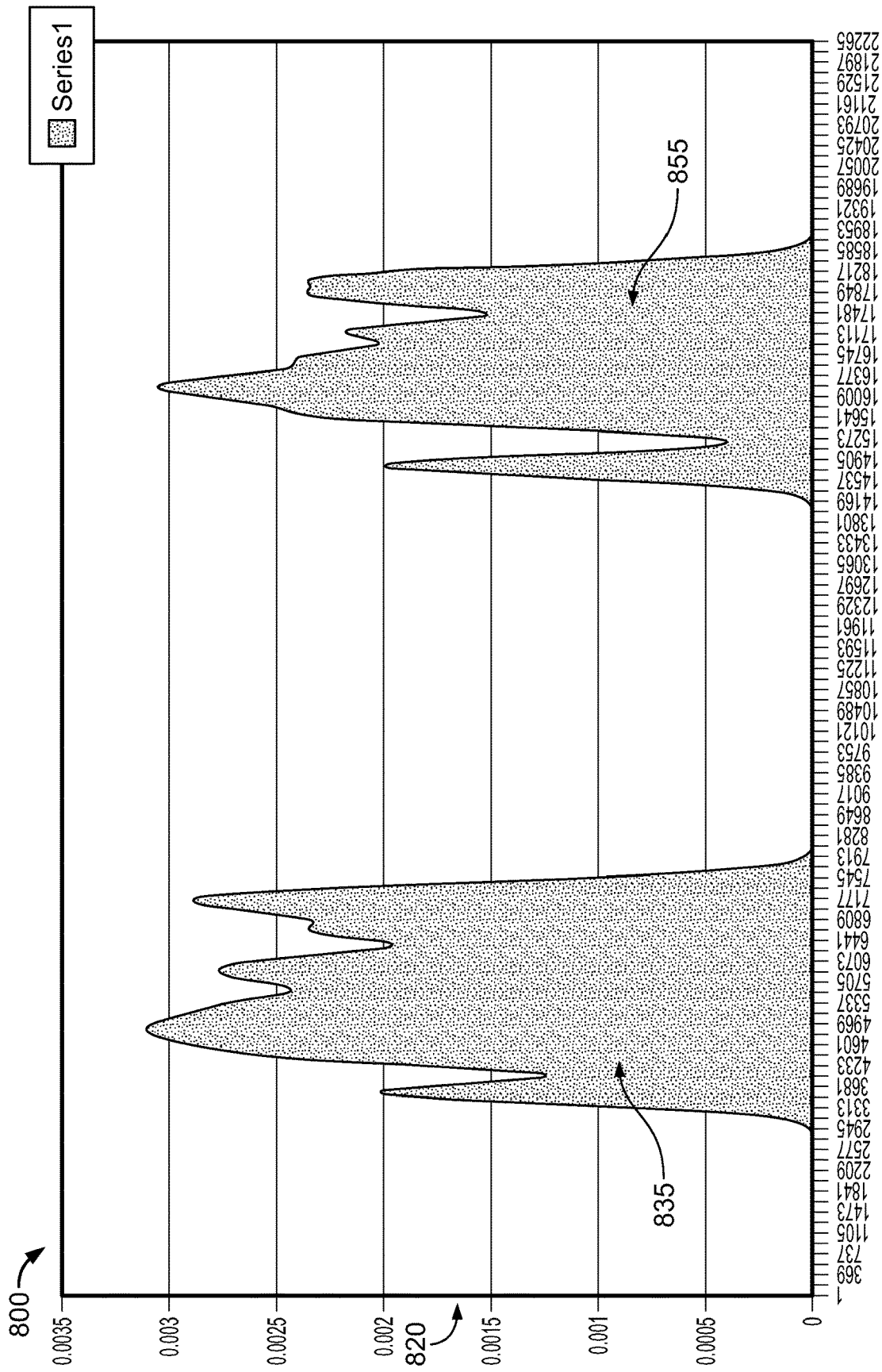
FIG. 8 depicts a graph with an example of a link density function with a cosine function with two troughs to produce the two clusters of links of FIG. 5.

FIG. 8 depicts a graph 800 with an example of a link density function with a cosine function with two troughs 835, 855 to produce the two clusters of links of FIG. 7. The y-axis has a scale 820 for the link distribution function, and the x-axis has discrete intervals 810 for the discrete link density function. In FIG. 8, the cosine function with two troughs 835, 855 can be convolved with a Gaussian function to produce the link placements in the two clusters 710, 720 of FIG. 7.

Other implementations may have other link density functions, such as a link density function having a cosine function with n troughs to produce n clusters of links (n is equal to or greater than 1) when the link density function is convolved with a Gaussian function, for example.

Figure 9:
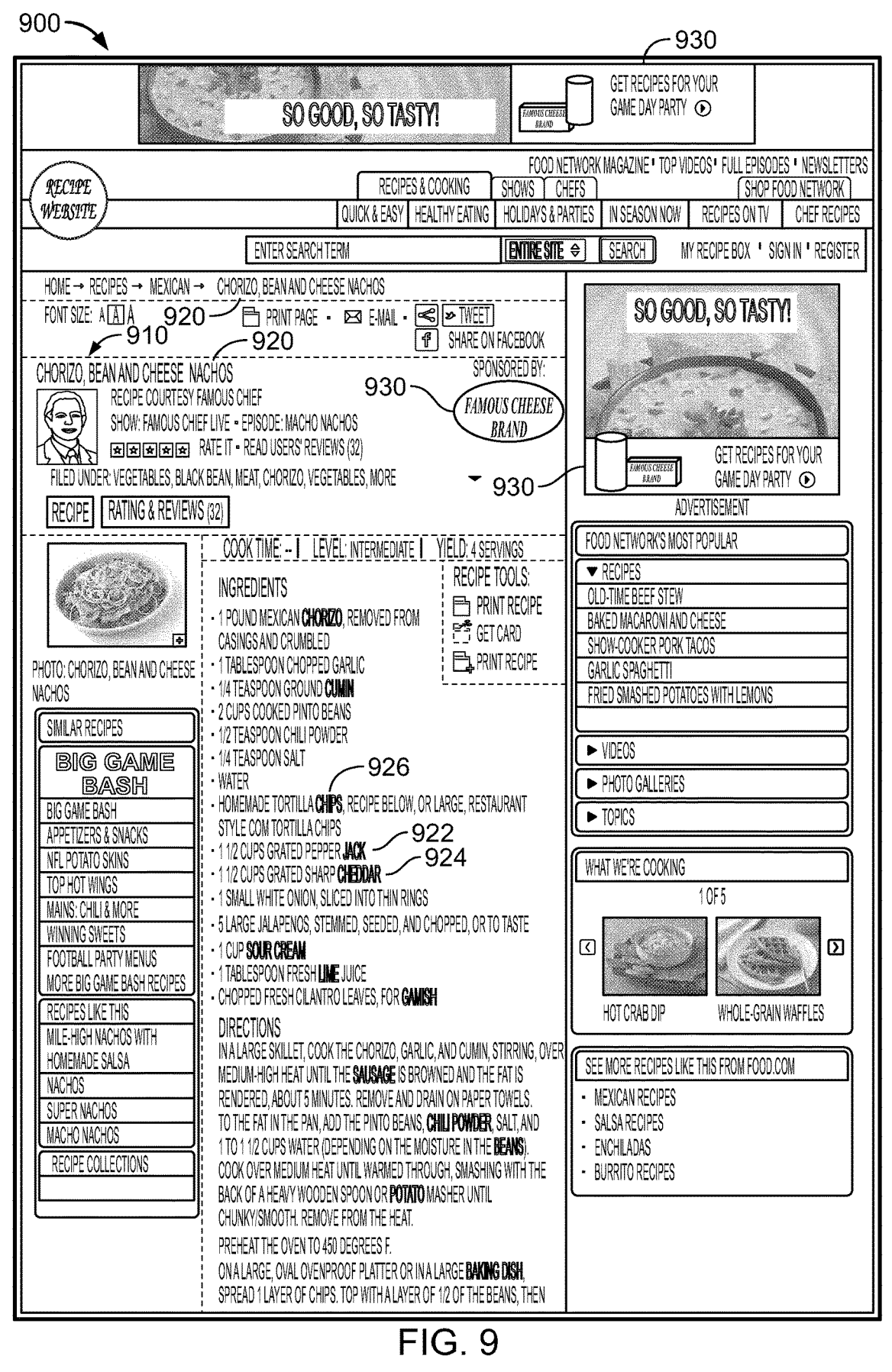

FIG. 9 depicts an example of a webpage 900 containing advertiser links 930 that have been positioned in the webpage 900 based on an analysis of cross-linkable phrases 920, 922, 924 and 926 in the text 910. The webpage 900 contains text 910 describing a cooking recipe. The document contains cross-linkable phrases 920, 922, 924 and 926 associated with the cooking recipe such as the phrase "Cheese Nachos" 920.

A link distribution function may be used to determine the placement of links 930 associated with phrases 920, 922, 924 and 926. In the case of FIG. 3, the phrases "cheese nachos" 920, "pepper jack [cheese]" 922, "sharp cheddar [cheese]" 924 and "Tortilla Chips" 926 are associated with "Famous Cheese Brand's" advertisements 930. In webpage 900, all of the instances of the phrase 920 are located near the top of the page and all of the other instances of the phrases 922, 924 and 926 are located near the center of the page. If all of the phrases 920, 922, 924 and 926 associated with advertisements 930 carry equal weight, the link distribution function applied to phrases 920, 922, 924 and 926 may emphasize placement of links 930 associated with phrases 920, 922, 924 and 926 in locations in the upper middle to upper sections of the webpage 900. In another example, if the phrase 920 carries more weight than the phrases 922, 924 and 926, the link may determine that the placement of the links 930 should be done closer to instances of phrase 920. In addition, the link distribution function may also determine placement of links 930 in webpage 900 based on weighting that emphasizes an advertisement link (e.g., weighing placement of the link as close to the top of the website with respect to the distribution of phrases 920, 922, 924 and 926 in the website). Thus, even if most of the instances of phrases 920, 922, 924 and 926 occur in the middle of the webpage, the links 930 may still be determined by the function to be best placed in the upper portion of the webpage 900 with respect to phrases 920, 922, 924 and 926.

Figure 10:
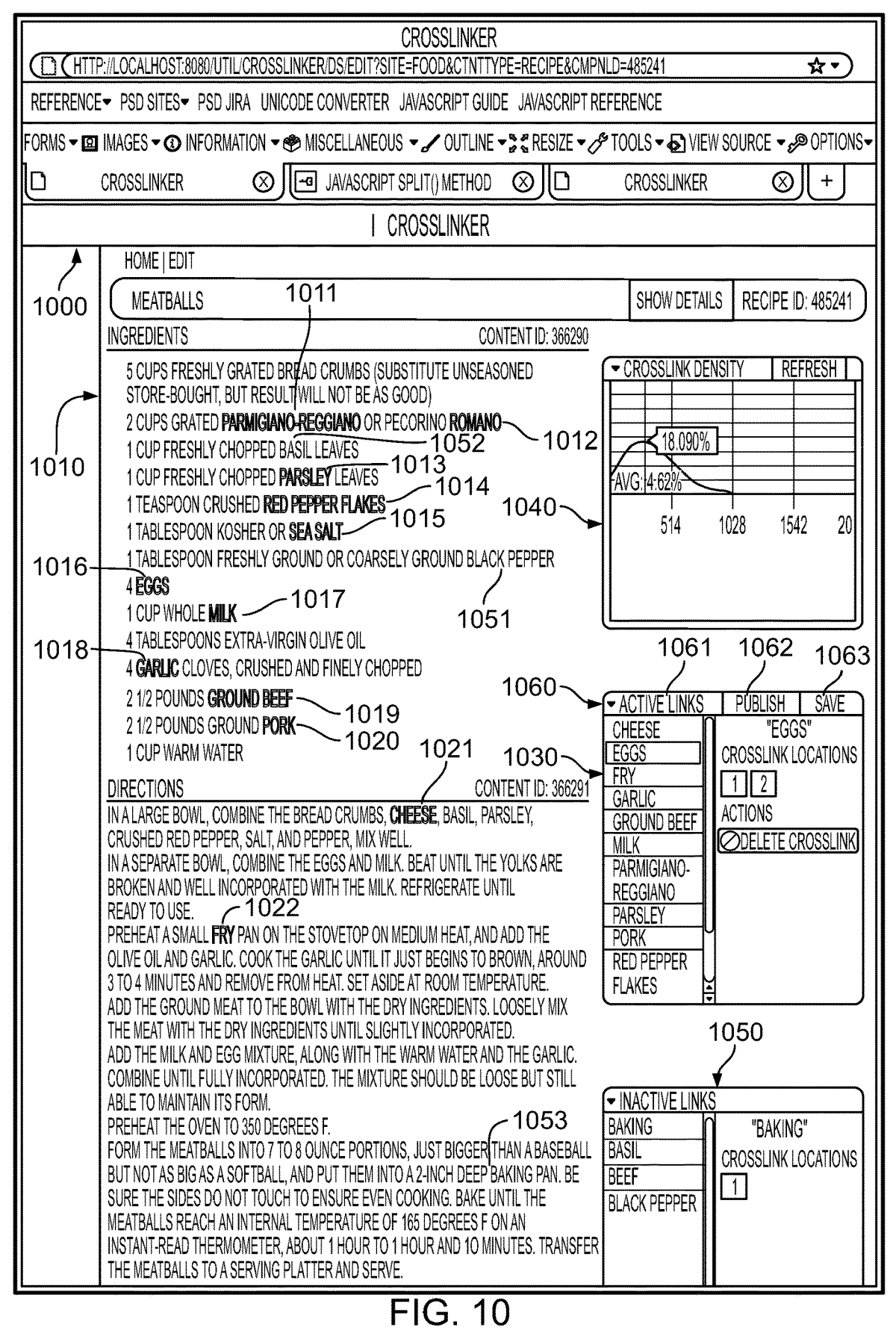

FIG. 10 depicts an example of a UI for a crosslinker tool 1000 that has identified various characters and phrases in the text of a webpage 1010 that is similar to the webpage of FIG. 9. In particular, identified characters and phrases 1011, 1012, 1013, 1014, 1015, 1016, 1017, 1018, 1019, 1020, 1021 and 1022 have been cross-linked while identified characters and phrases 1051, 1052 and 1053 have not been cross-linked.

The cross-linked characters and phrases may be managed through an active link management tool 1030. Active link management tool 1030 is configured to list the cross-linked characters and phrases and enables the displaying of cross-link density information through a graphic and/or textual output tool 1040. The active link management tool 1030 may also provide a filter 1060 that provides for filtering the displayed cross-linked characters in the list. For example, the filter 1060 may provide for a filter that shows all active links 1061, and also may be provided for a filter that displays published links 1062 and/or saved links 1063.

Identified characters and phrases that have not been cross-linked may also be managed through an inactive link management tool 1050. The inactive link management tool 1050 lists identified characters and phrases that have not been cross-linked, and may allow for the cross-linking of them.

Figure 11:
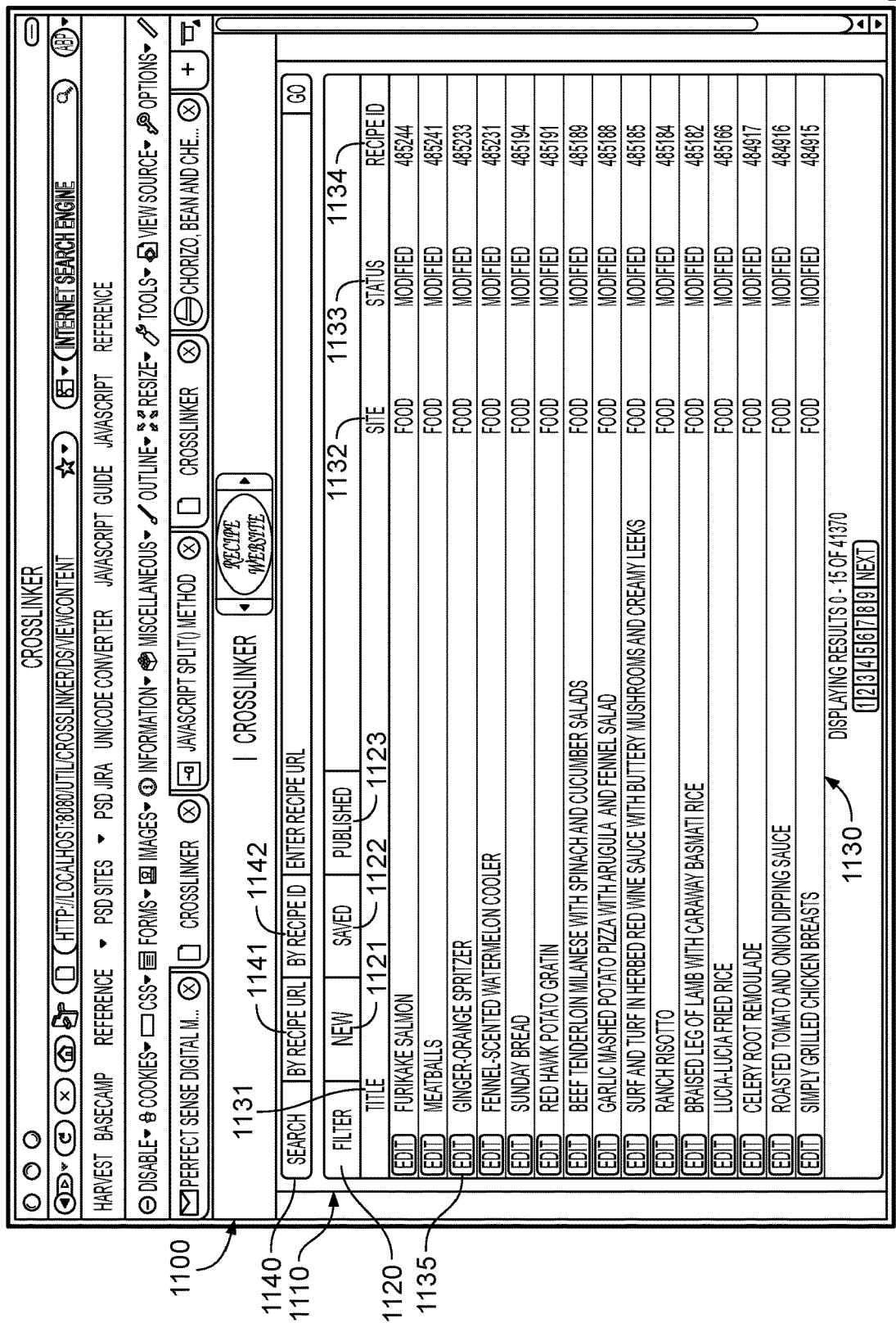
FIG. 11 depicts an example of a user interface of the crosslinker tool that enables inclusion of new hyperlinks that can be associated with identified words and phrases.

FIG. 11 depicts a second example of a UI 1100 for the crosslinker tool of FIG. 10 that enables link management for new webpages. The UI 1100 includes a webpage management tool 1110 that has a filter tool 1120, which enables a list of webpages 1130 to be displayed through the UI 1110. The webpages listed in 1130 may be edited through accessing the site through an edit selector 1135, which enables editing of the links in the selected webpage.

The filter tool 1120 may be configured to display newly created webpages 1121, saved webpages 1122 and/or published webpages 1123, for example. In addition, the filter tool 1120 may be configured to display webpage information such as the webpage's title 1131, the site hosting the webpage 1132, a status of the webpage 1133, and other identification information pertaining to the functionality of the website 1134, such as a Recipe ID 1142 for webpages that display cooking recipe information.

In addition to the filter tool 1120, a search tool 1140 may be provided to allow for custom searches of editable webpages. The search may be conducted, for example, through searching for the URL of the webpage 1141 and/or through searching for the Recipe ID 1142.

Some of the described embodiments of the subject matter and the operations can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded information for transmission to suitable receiver apparatus for execution by a data processing apparatus. The data processing apparatus may include the sensor, may be part of the sensor, may be a part of a system with the sensor, may be integrated within the system and/or sensor, may be part of receivers, transmitters, components and/or logic associated with the sensor or the receivers and/or transmitters, or any combination thereof. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

Various apparatuses, devices, and machines for processing data, may be used as a "data processing apparatus," including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be useful. What is claimed is:

What is claimed is:

1. A method for determining a placement of links on a document, the method comprising:
   accessing a link distribution function specifying a desired spatial configuration for placing links in a document;
   determining that a set of terms are present within the document, wherein each term included in the set of terms is predetermined to be associated with a corresponding link;
   identifying textual portions of the document that correspond to locations of the set of terms determined to be present within the document;
   determining that a subset of the textual portions satisfy the link distribution function, wherein each textual portion included in the subset of the textual portions includes a spatial distribution of terms that satisfies the desired spatial configuration for placing links in the document; and placing links corresponding to the set of terms in the document at the subset of the textual portions.

2. The method of claim 1, wherein:

the desired spatial configuration indicates a maximum number of links to be placed in a given textual region of the document; and a number of terms determined to be present within each textual portion included in the subset of the textual portions is below the maximum number of links indicated by the desired spatial configuration.

3. The method of claim 2, further comprising applying a Monte-Carlo function to the link distribution function.

4. The method of claim 3, wherein applying the Monte-Carlo function comprises applying a Metropolis-Hastings Monte Carlo function that minimizes a quantity of operations that are performed in determining that the subset of the textual portions satisfy the link distribution function.

5. The method of claim 1, wherein:

the set of terms are specified in a dictionary; and the dictionary specifies a list of terms, and a Uniform Resource Locator (URL) associated with each term included in the list of terms.

6. The method of claim 5, wherein placing links corresponding to the set of terms in the document at the subset of the textual portions by:

identifying, based on the dictionary, a URL associated with each term included in the set of terms, and placing links representing URLs identified to be associated with the set of terms in the document at the subset of the textual portions.

7. The method of claim 5, wherein:

the desired spatial configuration indicates a link density for inserting links into a given textual region of the document, wherein the link density reflects a number of characters within a string of characters that are associated with a link to be placed in the document.

8. A system comprising:

one or more computers and one or more storage devices storing instructions that are operable, when executed by the one or more computers, to cause the one or more computers to perform operations comprising:

accessing a link distribution function specifying a desired spatial configuration for placing links in a document;

determining that a set of terms are present within the document, wherein each term included in the set of terms is predetermined to be associated with a corresponding link;

identifying textual portions of the document that correspond to locations of the set of terms determined to be present within the document;

determining that a subset of the textual portions satisfy the link distribution function, wherein each textual portion included in the subset of the textual portions includes a spatial distribution of terms that satisfies the desired spatial configuration for placing links in the document; and placing links corresponding to the set of terms in the document at the subset of the textual portions.

9. The system of claim 8, wherein:

the desired spatial configuration indicates a maximum number of links to be placed in a given textual region of the document; and a number of terms determined to be present within each textual portion included in the subset of the textual portions is below the maximum number of links indicated by the desired spatial configuration.

10. The system of claim 9, wherein the operations further comprise applying a Monte-Carlo function to the link distribution function.

11. The system of claim 10, wherein applying the Monte-Carlo function comprises applying a Metropolis-Hastings Monte Carlo function that minimizes a quantity of operations that are performed in determining that the subset of the textual portions satisfy the link distribution function.

12. The system of claim 8, wherein:

the set of terms are specified in a dictionary; and the dictionary specifies a list of terms, and a Uniform Resource Locator (URL) associated with each term included in the list of terms.

13. The system of claim 12, wherein placing links corresponding to the set of terms in the document at the subset of the textual portions by:

identifying, based on the dictionary, a URL associated with each term included in the set of terms, and placing links representing URLs identified to be associated with the set of terms in the document at the subset of the textual portions.

14. A non-transitory computer-readable storage device encoded with computer program instructions that, when executed by one or more computers, cause the one or more computers to perform operations comprising:

accessing a link distribution function specifying a desired spatial configuration for placing links in a document;

determining that a set of terms are present within the document, wherein each term included in the set of terms is predetermined to be associated with a corresponding link;

identifying textual portions of the document that correspond to locations of the set of terms determined to be present within the document;

determining that a subset of the textual portions satisfy the link distribution function, wherein each textual portion included in the subset of the textual portions includes a spatial distribution of terms that satisfies the desired spatial configuration for placing links in the document; and placing links corresponding to the set of terms in the document at the subset of the textual portions.

15. The device of claim 14, wherein:

the desired spatial configuration indicates a maximum number of links to be placed in a given textual region of the document; and a number of terms determined to be present within each textual portion included in the subset of the textual portions is below the maximum number of links indicated by the desired spatial configuration.

16. The device of claim 15, wherein the operations further comprise applying a Monte-Carlo function to the link distribution function.

17. The device of claim 16, wherein applying the Monte-Carlo function comprises applying a Metropolis-Hastings Monte Carlo function that minimizes a quantity of operations that are performed in determining that the subset of the textual portions satisfy the link distribution function.

18. The device of claim 14, wherein:

the set of terms are specified in a dictionary; and the dictionary specifies a list of terms, and a Uniform Resource Locator (URL) associated with each term included in the list of terms.

\* \* \* \* \*